United States Patent [19]

Seto et al.

[11] Patent Number: 4,742,421

[45] Date of Patent: May 3, 1988

[54] MAGNETIC RECORDING DISC HAVING TENSIONED AND ELASTICALLY-SUPPORTED RECORDING SURFACE

[75] Inventors: Kunihira Seto; Kengo Oishi, both of Kanagawa, Japan

[73] Assignee: Fuji Photo Film Co., Ltd., Kanagawa, Japan

[21] Appl. No.: 889,715

[22] Filed: Jul. 28, 1986

[30] Foreign Application Priority Data

Aug. 3, 1985 [JP] Japan .......................... 60-119605[U]

[51] Int. Cl.$^4$ .............................................. G11B 5/82
[52] U.S. Cl. ...................................... 360/135; 428/65
[58] Field of Search ........................... 360/135, 97–99; 346/137; 428/65; 369/287, 288, 280

[56] References Cited

U.S. PATENT DOCUMENTS 4,623,570 11/1986 Alexander et al. ............. 360/135 X

FOREIGN PATENT DOCUMENTS 938095 9/1963 United Kingdom ............... 360/135

Primary Examiner—John H. Wolff
Attorney, Agent, or Firm—Sughrue, Mion, Zinn, Macpeak & Seas

[57] ABSTRACT

A magnetic recording disc having a rigid substrate disc is provided with an annular recess defined between inner and outer peripheral bonding rings. An annular elastic disc having a thickness slightly larger than the depth of the recess is placed therein. A flexible disc sheet is placed over the arrangement and held tight against the peripheral bonding rings so as to slightly compress the elastic disc while the inner and outer edges of the flexible disc sheet are bonded to the bonding rings. As a result, the flexible disc sheets are constantly tensioned as the slightly compressed elastic discs exert constant expansion pressure on the non-exposed surface of the flexible disc sheets. The recording and reproducing regions of the disc are, therefore, elastically supported by the elastic disc from below.

6 Claims, 2 Drawing Sheets

MAGNETIC RECORDING DISC HAVING TENSIONED AND ELASTICALLY-SUPPORTED RECORDING SURFACE

BACKGROUND OF THE INVENTION

1. Related Application

This application is related to the following applications: Japanese Patent Application No. 60-119603, corresponding to U.S. application Ser. No. 889,719, filed July 28, 1986; Japanese Patent Application No. 60-119604, corresponding to U.S. application Ser. No. 889,716, filed July 28, 1986; Japanese Patent Application No. 60-31603, corresponding to U.S. application Ser. No. 831,731 filed Feb. 21, 1986; Japanese Patent Application No. 60-126507, corresponding to U.S. application Ser. No. 889,717, filed July 28, 1986; Japanese Patent Application No. 60-144173, corresponding to U.S. application Ser. No. 910,918 filed Sept. 24, 1986; and, Japanese Patent Application No. 60-221031, corresponding to U.S. application Ser. No. 914,958 filed Oct. 3, 1986.

2. Field of the Invention

This utility model relates to a magnetic disc for magnetic recording in a direction parallel to or perpendicular to its surface.

2. Background Art

One example of a conventional magnetic disc is a rigid magnetic disc. The substrate of the rigid magnetic disc is made of rigid material. In general, the rigid magnetic disc employs an aluminum substrate (JIS A5086 for instance).

The rigid magnetic disc is generally formed as follows. An aluminum plate is machined on a lathe, and its surface is polished so that a data recording operation can be performed at high density because the space between the disc and the head is minimized. Thereafter, a magnetic layer is formed on the aluminum substrate by vacuum deposition or spin coating. For high density recording and reproducing, the surface of the disc should be smooth. However, it has been difficult for the conventional magnetic disc using the aluminum substrate to have a surface with a central line average roughness Ra of not more than 0.1 micrometers. Furthermore, since the substrate is rigid, in forming the magnetic layer, the continuous coating is limited by the web pass. That is, handling of the conventional rigid substrate is rather troublesome. On the other hand, a high density recording operation is greatly affected by the dust on the disc. Therefore, it is essential to manufacture magnetic discs in a dust-proof environment. Accordingly, the magnetic disc manufacturing process is considerably intricate, thus requiring an enormous sum of investment in equipment.

The conventional substrate, such as an aluminum substrate, is rigid. Therefore the head should not contact the magnetic layer in tracing it. However, it is difficult to maintain constant the narrow space between the head and the magnetic layer, and therefore signal errors frequently occur. Further, it is very difficult to further reduce the space between the head and the disc surface to thereby increase the recording density. If the magnetic head is accidentally brought into contact with the disc during the tracing operation with the narrow space maintained, a sliding frictional force is produced because the substrate is rigid. As a result of this frictional engagement, a great impact is applied collectively to the part of the magnetic layer which has contacted the head, so much so as to break the disc surface, thus reducing the service life of the disc.

Furthermore, the aluminum substrate polished as described above is expensive.

On the other hand, a magnetic disc as shown in FIG. 1 has been proposed in the art. In this magnetic disc, recesses are formed in both sides of a disc substrate 1, and floppy discs or flexible discs 2 (hereinafter referred to as "flexible disc sheets") having a magnetic layer on one side are bonded on both sides of the substrate 1 in such a manner that the magnetic layers are exposed on the exterior of the disc and gaps 3 are formed between the substrate 1 and the inner surface of the flexible disc sheets 2.

The magnetic recording surfaces of the magnetic disc thus constructed are flexible. Therefore, even when the head is accidentally brought into contact with the magnetic recording surface, or when a higher density recording operation is carried out with the head held in contact with the magnetic recording layer, the magnetic layer is scarcely broken, unlike that of the rigid disc. Accordingly, the technique of flexible discs can be utilized as it is. Furthermore, a smooth magnetic layer that is highly durable can be used as a magnetic disc's magnetic layer. Thus, this type of magnetic disc is being watched with great interest since it eliminates the difficulties accompanying a conventional rigid magnetic disc.

The inventors have conducted intensive research on the magnetic disc of this type, and found that it still suffers from serious difficulties. That is, in the case where the flexible disc sheets are only bonded on the substrate as shown in FIG. 1, the flexible disc sheets may relax into a curved shape, may not be satisfactorily bonded to the substrate, or may be creased.

SUMMARY OF THE INVENTION

Accordingly, an object of this invention is to eliminate the above-described difficulties accompanying a conventional magnetic disc.

More specifically, an object of the invention is to provide a magnetic disc in which the flexible disc sheets are maintained satisfactory tight at all times, so that the surface of the flexible disc sheet can be satisfactorily held against the magnetic head.

The foregoing object of the utility model has been achieved by the provision of a magnetic disc in which, according to the invention, annular recesses formed in both sides of a substrate. Annular elastic discs whose thickness is equal to or larger than the depth of the recesses are placed in both recesses. Flexible disc sheets are laid under tension in such a manner as to cover the elastic member.

DETAILED DESCRIPTION OF THE PREFERRED EMBODIMENTS

One embodiment of this invention will be described with reference to the accompanying drawings in detail.

Figure 2:
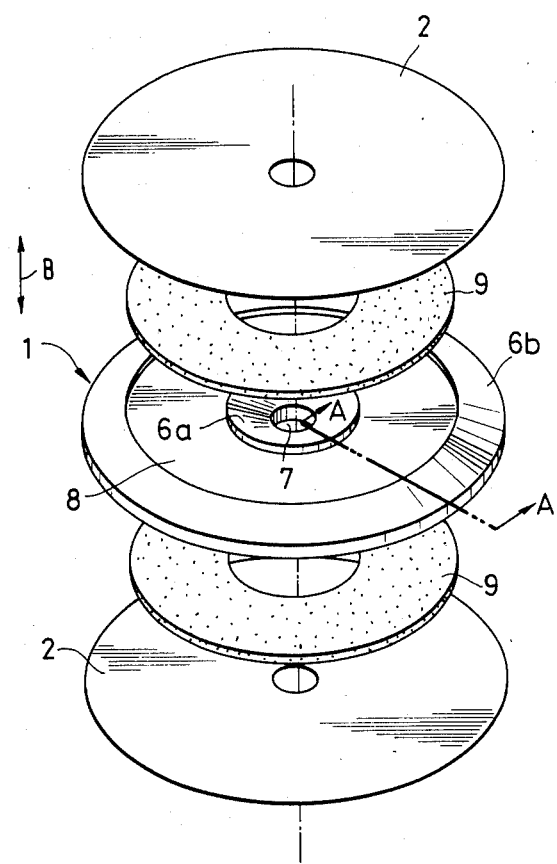
FIG. 2 is an exploded perspective view showing one embodiment of a utility model.

A magnetic disc according to the invention, as shown in FIG. 2 is formed by bonding flexible disc sheets 2 on both sides of a substrate 1. The substrate is relatively thick so as to be rigid. The substrate 1 has a central hole 7 into which a disc rotating rotary shaft (spindle) is inserted. An inner peripheral bonding ring 6a around the central hole 7, and an outer peripheral bonding ring 6b rise above the radially intermediate portions of the substrate 1. These bonding rings 6a and 6b are larger in thickness than the remaining part of the substrate 1, thus providing annular recesses 8 on both sides of the substrate 1. Preferably, as shown in FIG. 2, the top surfaces of the bonding rings 6a and 6b slope peripherally toward the axial median of the substrate 1. The sloped angle from the disc sheet 2 to the slope of the ring 6a is preferably 5° to 40°, more preferably 8° to 30°. An annular elastic disc 9 is inserted in each of the annular recesses 8. The outside diameter and the inside diameter of the annular elastic disc 9 are substantially equal to the diameters of the outer and inner walls of the annular recess 8, respectively. The thickness of the annular elastic disc 9 is slightly larger than the depth of the recess 8.

The flexible disc sheets 2 are laid over the elastic discs 9, and have their inner and outer peripheral edges bonded to the bonding rings 6a and 6b, as shown in FIG. 2. In the sheet bonding operation, the flexible disc sheets are held tight with a constant tensile force so as to slightly compress the elastic discs 9 while the inner and outer peripheral edges of the flexible disc sheets 2 are bonded to the bonding rings 6a and 6b. Thus, in the manufactured state, the flexible disc sheets 2 are constantly tensioned as the slightly compressed elastic discs 9 exert constant expansion pressure on the non-exposed surface of the flexible disc sheets 2 such that the recording and reproducing regions thereof are elastically supported by the elastic discs 9 from below.

The elastic discs 9 may be made of foamed plastic resin such as foamed urethane. However, the material of the elastic discs 9 is not particularly limited.

The inside and outside diameters of the substrate 1, and the dimensions of the bonding parts 6a and 6b can be freely determined according to the purpose of use of the disc.

The material of the substrate 1 should first of all be such that the substrate is not thermally deformed during heat treatment. Accordingly, a metal such as aluminum or aluminum alloy, glass, a polymer which causes no thermal deformation, at least during heat treatment, and combinations of these materials can be employed to form the substrate 1.

Next, it is essential that the material be inexpensive. A polymer substrate is generally low in manufacturing cost because it can be mass-produced by injection molding. In the invention, as is apparent from FIG. 3, owing to the provision of the gaps 3, the magnetic layers are not affected by the surface roughness of the substrate. Therefore, even if the substrate 1 is made of aluminum, which is a typical metal, the accuracy of polishing the substrate may be relatively low, and therefore the polishing cost is also low.

In the invention, the flexible disc sheet 2 may be made of the material which is used for manufacturing so-called "floppy discs". The support on which the magnetic layer of the flexible disc sheet 2 is formed may be made of plastic film such as polyethylene terephthalate film of biaxial orientation (PET).

It is preferable that the central roughness Ra of the side of the support of the flexible disc sheet 2 on which the magnetic layer is formed is not more than 0.1 micrometers. Employing this support can increase the recording density of the magnetic disc manufactured.

If, in the flexible disc sheet 2, both sides of the support are made smooth, then the friction is increased, as a result of which two sheets are liable to stick together, and therefore it is rather difficult to handle the sheet during the manufacture of the magnetic disc. Such a support is also expensive.

However, if the surfaces of the disc support are rough, then the previously mentioned gap between the head and the disc surface is increased when the magnetic layer is formed. That is not suitable for high density recording. Accordingly, it is desirable that the magnetic layer is formed on a smooth side of the support, the other side of which is rough.

The magnetic layer may be formed on the support by coating it with magnetic iron oxide or ferromagnetic alloy powder and binder, or it may be formed on the support by vacuum deposition, sputtering or ion plating. That is, it may be formed by various methods of vapor deposition of plating.

The elastic discs 9 are provided for two purposes. First, when the magnetic layer of the flexible disc sheet 2 is brought into contact with the head, the frictional force is dispersed to increase the durability. Secondly, the magnetic layer suitably contacts the head so as to reduce the gap between the head and the magnetic layer to thereby permit high density recording. The thickness of the elastic discs 9 and the depth of the recesses 8 are not particularly specified. However, they are preferably at least 0.15 mm with a view to the intended use of the magnetic disc. A radial length of each elastic disc 9 is 45 to 70%, more preferably, 50 to 65% of a radius of the substrate 1.

In the invention, the thickness of the substrate 1 is 1 to 5 millimeter, and the thickness of the flexible disc sheets 2 bonded to the substrate 1 is generally 10 to 100 micrometers. Since the dimensional stability of the magnetic disc depends on that of the substrate 1, it is preferable to use the substrate which has excellent dimensional stability.

The adhesive used to bond the disc sheet 2 to the substrate 1 may be a thermo-setting adhesive or a radiation setting adhesive, such as an electron setting adhesive or an ultraviolet-ray setting adhesive. In order to facilitate the bonding operation, it is preferable to coat one or both of the sheet bonding surfaces with a polymer such as polyester or polycarbonate or to subject them to physical surface treatment such as corona discharge, glow discharge or flame treatment.

Figure 1:
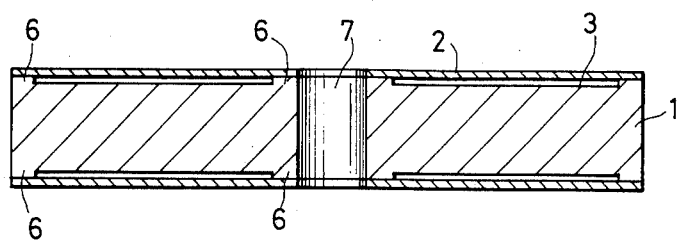
FIG. 1 is a sectional view outlining the fundamental construction of a magnetic disc to which the technical concept of the utility model is applied.
Figure 3:
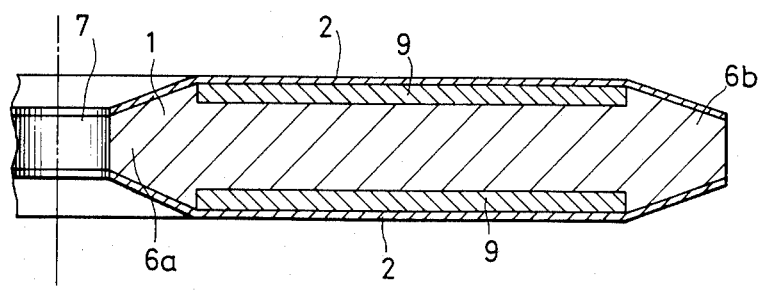
FIG. 3 is an enlarged sectional view taken along line A—A in FIG. 2.

In the magnetic disc of the invention, the flexible disc sheets 2 are bonded on the substrate 1 as shown in FIG. 3. Furthermore, in the bonding process, the annular elastic discs 9 are compressed by the flexible disc sheets 2 during the manufacture of the magnetic disc. Therefore, in the case where, in the flexible disc sheets 2, the resin of the flexible disc sheets relaxes or when the magnetic disc is used over a long period, the annular elastic discs 9 expand vertically of the substrate (as indicated by the arrows B in FIG. 2) to prevent the flexible disc sheets 2 from being slackened. An example of these physical distortions is the case where a variation of temperature or humidity expands or contracts the temperature or humidity expands or contracts the substrate 1 which is of a material different from that of the flexible disc sheets 2. The difference in thermal expansion properties is absorbed by the expansion or contraction of the annular elastic discs 9, so that the flexible disc sheets 2 are maintained tight at all times.

As was described above, in the magnetic disc of the utility model, the elastic discs are provided in the recesses formed in the substrate and the flexible disc sheets in order that the elastic discs elastically support the flexible disc sheets. Therefore, the flexible disc sheets are prevented from being slackened with time and from losing tightness by the variation of temperature or humidity. Furthermore, for the same reason, the shock absorbing action of the sheet surface is suitably maintained. Also, the adhesive adverse effect of creases on the recording and reproducing region which are liable to be formed in the bonding parts of the flexible disc sheets in bonding the latter on the substrate can be prevented.

Thus, in the magnetic disc of the utility model, the flexible disc sheets are maintained suitably tight at all times, so that the surfaces of the flexible disc sheets can be satisfactorily held against the magnetic head.

What is claimed is:

1. A recording disc, comprising:
   a substrate having on at least one principal surface an annular recess formed between two annular rings;
   an annular elastic disc substantially filling said recess and having a height at least as high as a depth of said recess; and
   a flexible recording sheet covering said elastic disc and being bonded to said rings to slightly compress said annular elastic disc such that said bonded flexible recording sheet is elastically supported and kept under tension by said annular elastic disc.

2. A recording disc as recited in claim 1, wherein an uncompressed height of said elastic disc is greater than said depth of said recess.

3. A recording disc as recited in claim 1, wherein:
   said substrate has two annular recesses on respective principal surfaces between respective pairs of annular rings,
   two annular elastic disc substantially fill respective ones of said recesses and having heights at least as high as respective depths of said recesses; and
   two flexible recording sheets are bonded under tension to respective pairs of said rings and covering respective elastic discs.

4. A recording disc as recited in claim 1, wherein said recording sheet comprises a flexible support coated on one principal surface with a recording material, a surface roughness of said first principal surface of said support being less than that of its second principal surface.

5. A recording disc as recited in claim 1, wherein said elastic disc comprises foamed plastic resin.

6. A recording disc, comprising:
   a substrate having on each of its principal surfaces a recess formed between an inner peripheral annular protrusion and an outer peripheral annular protrusion, inner and outer walls being formed between said inner and outer protrusions respectively to define the perimeter of said recess;
   two annular elastic discs disposed in respective ones of said recesses adjacent to said inner wall and said outer wall of said respective recess, a height of said elastic discs being no less than heights of said walls; and
   a respective flexible recording sheet covering each said elastic disc and being bonded to said substrate to slightly compress said annular elastic disc such that said bonded flexible recording sheet is elastically supported and kept under tension by said annular elastic disc.

* * * * *